US010309538B2

(12) United States Patent
Weber

(10) Patent No.: US 10,309,538 B2
(45) Date of Patent: Jun. 4, 2019

(54) DEVICE AND METHOD FOR ATTACHING SEAL ELEMENTS

(71) Applicant: MTU Aero Engines AG, Munich (DE)

(72) Inventor: Julian Weber, Munich (DE)

(73) Assignee: MTU Aero Engines AG, Munich (DE)

( * ) Notice: Subject to any disclaimer, the term of this patent is extended or adjusted under 35 U.S.C. 154(b) by 342 days.

(21) Appl. No.: 15/007,589

(22) Filed: Jan. 27, 2016

(65) Prior Publication Data

US 2016/0215887 A1 Jul. 28, 2016

(30) Foreign Application Priority Data

Jan. 28, 2015 (DE) .................. 10 2015 201 401

(51) Int. Cl.
| | |
|---|---|
| *F16J 15/3268* | (2016.01) |
| *F16J 15/32* | (2016.01) |
| *F01D 11/00* | (2006.01) |
| *F01D 11/02* | (2006.01) |
| *F02C 7/28* | (2006.01) |
| *F16J 15/3288* | (2016.01) |

(52) U.S. Cl.
CPC .............. *F16J 15/32* (2013.01); *F01D 11/001* (2013.01); *F01D 11/02* (2013.01); *F02C 7/28* (2013.01); *F16J 15/3268* (2013.01); *F16J 15/3288* (2013.01)

(58) Field of Classification Search
CPC ...... F16J 15/32; F16J 15/3268; F16J 15/3288; F16J 15/44; F01D 11/02; F01D 11/001; F01D 11/28; F01D 11/08; F01D 5/20; F01D 5/225; F01D 11/005; F02C 7/28; F05B 2240/571

USPC ....... 277/300, 309, 355, 590; 60/39.32, 800; 415/111, 134

See application file for complete search history.

(56) References Cited

U.S. PATENT DOCUMENTS

| | | | | |
|---|---|---|---|---|
| 5,265,412 A | * | 11/1993 | Bagepalli | F01D 9/023 277/355 |
| 5,308,088 A | * | 5/1994 | Atkinson | F16J 15/3288 277/355 |
| 5,639,211 A | * | 6/1997 | Bintz | F01D 5/10 415/173.7 |
| 5,688,105 A | * | 11/1997 | Hoffelner | F01D 11/02 277/355 |
| 5,939,211 A | * | 8/1999 | Mormann | A61C 13/0003 264/16 |

(Continued)

FOREIGN PATENT DOCUMENTS

| | | |
|---|---|---|
| DE | 10 2013 205 922 A1 | 10/2014 |
| WO | WO 03/056216 A1 | 7/2003 |

*Primary Examiner* — Ryan J. Walters
*Assistant Examiner* — Lawrence Averick
(74) *Attorney, Agent, or Firm* — Crowell & Moring LLP

(57) ABSTRACT

A device for attaching seal elements in a recess, particularly in an installation groove designed in a flow machine, is disclosed. At least one fixing body is arranged between a seal carrier element and a clamping body assigned to the seal carrier element, where the fixing body is integrally connected to the seal carrier element and the clamping body by bar-like connections that can be detached when subjected to a force. In addition, at least one plastic deformable structure is designed on the fixing body. An attachment method as well as a production method for the device is also disclosed.

11 Claims, 2 Drawing Sheets

(56) References Cited

U.S. PATENT DOCUMENTS

| | | | | |
|---|---|---|---|---|
| 8,162,324 | B2* | 4/2012 | Deo | F01D 11/003 |
| | | | | 277/413 |
| 8,794,918 | B2* | 8/2014 | Ali | F01D 11/08 |
| | | | | 415/230 |
| 2002/0020968 | A1* | 2/2002 | Gail | F16J 15/3288 |
| | | | | 277/355 |
| 2004/0018085 | A1* | 1/2004 | Dhar | F01D 11/00 |
| | | | | 415/174.2 |
| 2004/0101403 | A1* | 5/2004 | Turnquist | F01D 11/02 |
| | | | | 415/174.2 |
| 2004/0247430 | A1* | 12/2004 | Brisson | F01D 11/001 |
| | | | | 415/174.2 |
| 2005/0116423 | A1* | 6/2005 | Beichl | F16J 15/3288 |
| | | | | 277/355 |
| 2011/0200432 | A1* | 8/2011 | Alamsetty | F16J 15/3288 |
| | | | | 415/230 |
| 2012/0177483 | A1* | 7/2012 | Ali | F01D 11/08 |
| | | | | 415/173.3 |
| 2013/0181408 | A1* | 7/2013 | Pakkala | F01D 11/001 |
| | | | | 277/347 |
| 2016/0003360 | A1* | 1/2016 | Klaen | F16J 15/3288 |
| | | | | 277/355 |
| 2016/0047262 | A1* | 2/2016 | Cernay | F16J 15/3252 |
| | | | | 277/355 |
| 2017/0167613 | A1* | 6/2017 | Ahn | F01D 11/12 |

* cited by examiner

DEVICE AND METHOD FOR ATTACHING SEAL ELEMENTS

This application claims the priority of German Patent Application No. 10 2015 201 401.0 filed Jan. 28, 2015, the disclosure of which is expressly incorporated by reference herein.

BACKGROUND AND SUMMARY OF THE INVENTION

The invention relates to a device for attaching seal elements in a recess. The invention also relates to a method for attaching seal elements in a recess using a device as well as a method for producing a corresponding device.

Such seal elements or systems are used particularly for so-called gap-maintaining systems in compressor and turbine components of flow machines. Such sealing systems thereby have the task of keeping to a minimum a seal gap between a rotating component, e.g., of a blade system, and a stationary component, e.g., a housing, of the flow machine, and thereby ensuring stable operating behavior while maintaining a high degree of efficiency. The mentioned sealing systems may involve so-called brush seals or labyrinth seals. In doing so, for example, for attaching mounting plates for brush seals, one generally requires recesses or mounting grooves in the relevant component with an undercut. The housing panels used are mortised into these mounting grooves with an undercut and secured by means of a corresponding deformation of the housing panels. To attach labyrinth seals in U-shaped mounting grooves, one generally uses mortise wires. However, a disadvantage of the known devices and methods for attaching seal elements in a recess is that these are designed very elaborately and are therefore time-intensive to install. Also, additional elements such as the mentioned mortise wires are required.

A device is known from DE 10 2013 205 922 A1 for attaching seal elements in a recess that enables one to simply and rapidly install the seal elements. In addition, the described fixing bodies allow for secure installation and good retention due to a force-fit with a brush seal housing by means of self-retention. However, placement procedures and component vibrations may result in an undesired detaching of the fixing body.

The object of the present invention is therefore to create a device and a method for attaching seal elements in a recess, which ensure additional protection against the detaching of the fixing body. An additional object is to produce a generic device in a geometrically accurate and cost-effective manner.

Advantageous embodiments of the device shall be considered as advantageous embodiments of the attachment method according to the invention and vice versa.

A device according to the invention for attaching seal elements in a recess has at least one seal carrier element comprising at least one seal element. At least one fixing body is thereby arranged between the seal carrier element and a clamping body assigned to the sealing carrier element, where the fixing body is connected to the seal carrier element and the clamping body in an integral manner through bar-like connections that are detachable when subjected to a force. There is also designed on the fixing body at least one plastic deformable structure. By means of the design according to the invention of the device for attaching seal elements, on the one hand simplified and faster installation of the seal elements is made possible by the fact that elaborate grooves with an undercut as well as additional attachment elements can be omitted since the fixing body, in a mortised state, ensures a force-fit between the device according to the invention and the recess or the side walls of the recess. Secondly, the plastic deformable structure assures an additional form-fit between the fixing body and the device according to the invention and the recess or the side walls of the recess. This results in an additional safeguard against loosening of the fixing body during placement procedures and when the component vibrates. In an advantageous design of the of the device according to the invention, the fixing body is designed in such a manner that when the connection disengages between the fixing body and seal carrier element on the one hand and between the clamping body and the fixing body on the other, a force-fit results between the fixing body, the seal carrier element, the clamping body, and side walls of the recess as does a form-fit at least partially between the plastic deformable structure and the seal carrier element and/or the clamping body. In this way, a more secure attachment of the device according to the invention is ensured in the installation groove or the recess by a force- and form-fit. In addition, the attachment of the device according to the invention is possible by means of a simple mortising of the fixing body and the resulting force- and form-fit. The mentioned recess may be an installation groove designed in a flow machine.

In additional designs of the device according to the invention, the plastic deformable structure is designed as at least a bar- or pin-like projection on an end, of the fixing body, pointing to the recess. Other shapes are also possible. It is important in the design of the structure that it is sized in such a manner that a plastic deformation of the material of the structure or the structure itself is possible when subjected to a force. The fixing body and its plastic deformable structure may thereby consist of a nickel-based alloy for example. Furthermore, there is the possibility that the plastic deformable structure can be inserted in at least one recess designed in the seal carrier element and/or the clamping body, under at least a partial form-fit. The design or the shape of the recess may thereby at least correspond partially to the shape of the bar- or pin-like projection. These design possibilities of the device according to the invention result in secure connections between the fixing body and the seal carrier element and/or the clamping body. However, it is also possible that the shape of the structure is designed for a predetermined expansion and direction of the form-fit. In this way, the structure can be guided in a direction- and target-true manner in a corresponding recess in the seal carrier element and/or the clamping body. The location and position of the deformed structure can thus be determined and can be easily adapted to the existing structural circumstances. In addition, the structure can be designed in a one-piece manner with the fixing body. In this way, the structure with the fixing body can be produced in a particularly inexpensive manner. In particular, the one-piece or integral production of the fixing body takes place by means of an additive or generative production process.

In additional embodiments of the device according to the invention, the seal carrier element can be designed as a housing to accommodate the seal element. The seal element can thereby be designed as a brush seal. Furthermore, it is possible that the seal carrier element is designed as a base element of the seal element, where the seal element is a labyrinth seal with corresponding labyrinth fins.

In an additional advantageous embodiment of the device according to the invention, the bar-like connections are designed in such a manner that they each protrude from the seal carrier element and the corresponding opposite clamping body, while forming an angle pointing in the direction of the recess or installation groove. After mortising and detaching the fixing body from the bar-like connections to achieve the aforementioned force- and form-fit, the diagonally placed connection bars prevent a backward sliding of the fixing body by means of the resulting mechanical clamping due to their arrangement and design. In turn and as a result, secure attachment of the seal elements in the recess is assured.

In additional advantageous embodiments of the device according to the invention, a space is designed between the seal carrier element and the opposing clamping body for accommodating the fixing body with the deformable structure tapering toward the recess. By mortising a correspondingly shaped fixing body, the seal carrier element and the clamping body are moved away from each other in different directions and correspondingly fixed in the recess. A clearance can thereby be designed between a fixing body end pointing toward the recess and a bottom of the recess. The distance between the end of the fixing body and the bottom of the recess may be predefined to define the magnitude of the force- and form-fit between the individual elements of the device according to the invention.

In additional advantageous embodiments of the device according to the invention, the fixing body is designed with the deformable structure generally tapering toward the recess. The fixing body can thereby be designed in a wedge- or frustoconical-shaped manner. Interacting with the space formed between the seal carrier element and the opposing clamping body, this shape of the fixing body results in a secure force- and form-fit between the mentioned elements after a detaching of the fixing body from the bar-like connections and a mortising toward the recess. However, other shapes are also conceivable for the fixing body. The shape of the fixing body must thereby be adapted in each case to the space formed between the seal carrier element and the opposing clamping body. It is thereby important that after a disengagement of the connection between the fixing body and the seal carrier element or the clamping body, there results a force- and form-fit between the fixing body, the seal carrier element, the clamping body and the side walls of the recess.

In additional advantageous embodiments of the device according to the invention, the fixing body with the plastic deformable structure, the seal carrier element, the clamping body, as well as the bar-like connections are designed in a one-piece manner. In particular, the one-piece or integral production of the device according to the invention occurs by means of a generative production process. In addition, it is possible that the fixing body, the seal carrier element, the clamping body, the bar-like connections as well as the seal element designed as a labyrinth seal are also designed in a one-piece manner. Here, too, the integral production of the device can occur by means of a generative production process.

The invention also relates to a method for attaching seal elements in a recess using a device as described previously, where an embodiment of the method comprises the following steps:

a) introducing the device into the recess;
b) applying a force towards the recess on the fixing body in such a manner that a disengagement of the connection between the fixing body and the seal carrier element on the one hand and between the clamping body and the fixing body on the other is effected; and
c) continuing to apply force on the fixing body until on the one hand a force-fit results between the fixing body, the seal carrier element, the clamping body, and side walls of the recess and on the other, at least partially a form-fit between the plastic deformable structure and the seal carrier element and/or the clamping body results.

This method ensures a simple and rapid installation of the seal elements in the corresponding recess. Advantageously, additional attachment elements or a special and elaborate design of the recess can be avoided. In addition, the fixing element is protected against disengaging from the connection. The recess may be an installation groove designed in a flow machine.

The invention also relates to a method for producing a device according to the invention as described precedingly. The device according to the invention is thereby produced by means of an additive or generative production process. In this way, the generative production process may be a selective laser melting or a selective laser sintering process. Other additive or generative production processes are also conceivable. By using generative production processes, a geometrically accurate and cost-effective production of the device, according to the invention, for attaching seal elements is possible.

DETAILED DESCRIPTION OF THE DRAWINGS

Figure 1:
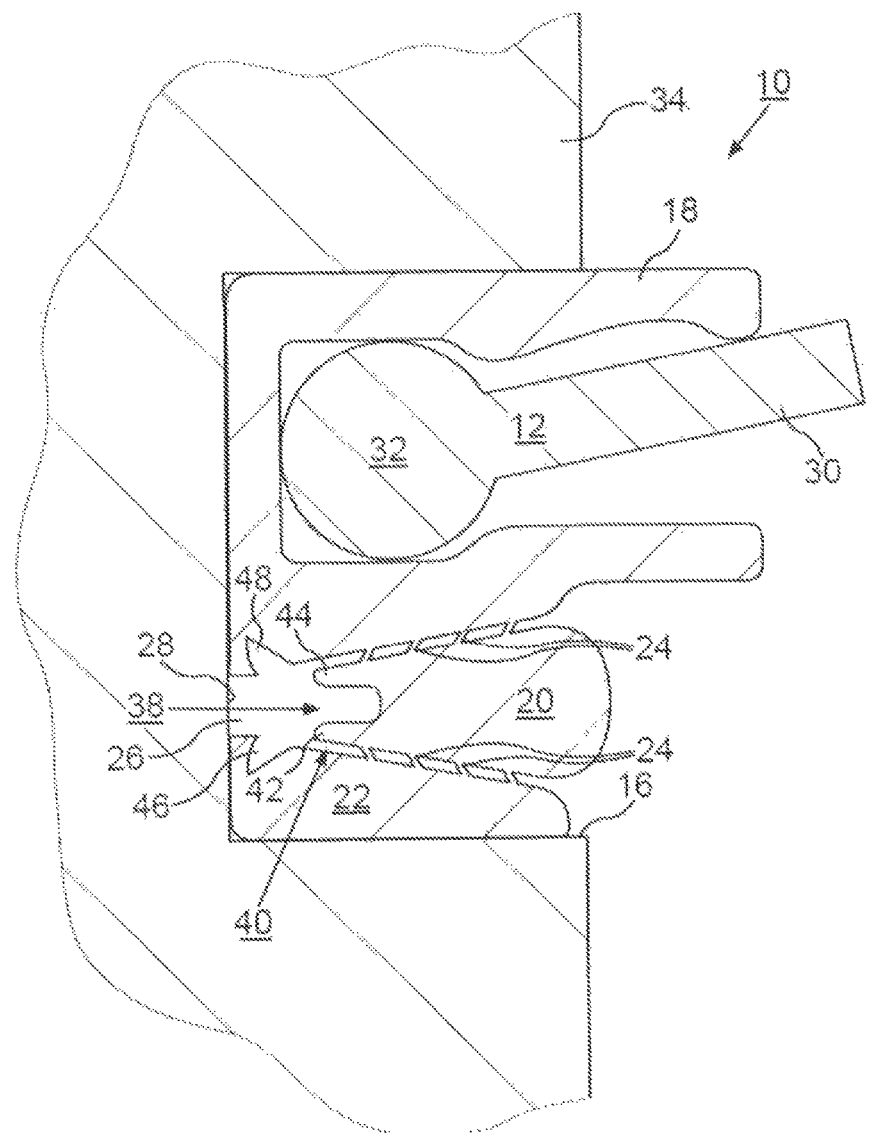
FIG. 1 depicts a schematic cross-sectional view of a first embodiment of the device according to the invention.

The first embodiment depicted in FIG. 1 of a device 10 for attaching seal elements comprises a seal carrier element 18, a fixing body 20 with a plastic deformable structure 40, and a clamping body 22 assigned to seal carrier element 18. Fixing body 20 is thereby fixed between seal carrier element 18 and clamping body 22 by means of bar-like connections 24. In the depicted embodiment, seal carrier element 18 is designed as a housing for accommodating a brush seal. Seal element 12 designed as a brush seal thereby consists of a plurality of schematically depicted fibers 30, which are wound around a unit 32 consisting of a clamping ring and a core of the brush seal. The thickened end of the brush seal or unit 32 is thereby seated within seal carrier element 18 designed as a housing, wherein the interior walls of the housing are shaped in such a manner that a secure fixing of the brush seal in the housing is ensured. The structure of the brush seal per se corresponds to known brush seals.

Device 10 is arranged in a recess 16. In the depicted embodiment, recess 16 is an installation groove designed in a component 34 of a flow machine. The flow machine may be a steam or gas turbine or an aircraft engine, particularly a compressor or a turbine of an aircraft engine.

In addition, one can see in the depicted embodiment that fixing body 20 with structure 40 is designed in a generally wedge-shaped manner, where fixing body 20 tapers toward recess 16 or bottom 28 of recess 16. The same applies for a space, designed between seal carrier element 18 and opposing clamping body 22, for accommodating fixing body 20. It too is designed in a tapering manner toward recess 16. One can see that the plastic deformable structure 40 comprises two bar- or pin-like projections 42, 44. These are designed on an end 38, of fixing body 20, pointing toward recess 16. Other shapes are also possible. In addition, it becomes clear that plastic deformable structure 40 with its projections 42, 44 can each be inserted in one of the recesses 46, 48 designed in seal carrier element 18 and clamping body 22, under at least a partial form-fit. The curved ends of projections 42, 44 thereby prescribe the direction of the deformation of this region. Recesses 46, 48 are adapted in their shape or design to the shape of projections 42, 44. In this way, structure 40 can be guided in a direction- and target-true manner into corresponding recesses 46, 48. The location and position of the deformed structure can thus be determined and can be easily adapted to the existing structural circumstances. In addition, structure 40 is designed in a one-piece manner with fixing body 20.

By mortising fixing body 20 toward recess 16 or bottom 28 of recess 16, fixing body 20 is disengaged from bar-like connections 24 when subjected to a force (not depicted). By disengaging the connection between fixing body 20 and seal carrier element 18 or clamping body 22, a force-fit results between fixing body 20, seal carrier element 18, clamping body 22, and the side walls of recess 16. In addition, a form-fit results between recesses 46, 48 and projections 42, 44 or structure 40 of fixing body 20. Fixing body 20 presses both seal carrier element 18 and clamping body 22 against the side walls of recess 16 and thereby fixes device 10 within recess 16. Bar-like connections 24 are thereby designed in such a manner that they are designed to each protrude from seal carrier element 18 and opposing clamping body 22, while forming an angle pointing to recess 16 or bottom 28 of recess 16. This diagonal position of connections 24 ensures that fixing body 20 can no longer slide out of recess 16 after the disengagement of bar-like connections 24. The mentioned form-fit between structure 40 and seal carrier element 18 as well as opposing clamping body 22 also safeguards fixing body 20 from an unintended separation from the connection, e.g., when component 34 vibrates severely.

Furthermore, it becomes clear that between an end 38 of fixing body 20 facing bottom 28 of recess 16 and bottom 28 of recess 16, there is formed a space 26. By means of the distance of end 38 from bottom 28, the mortising of fixing body 20 towards installation groove 16 is made possible and also limited.

Fixing body 20, seal carrier element 18, clamping body 22 as well as bar-like connections 24 are designed in a one-piece manner. The design of device 10 also enables the brush seal to be used prior to installation of the brush seal housing in recess 16 in the housing.

Figure 2:
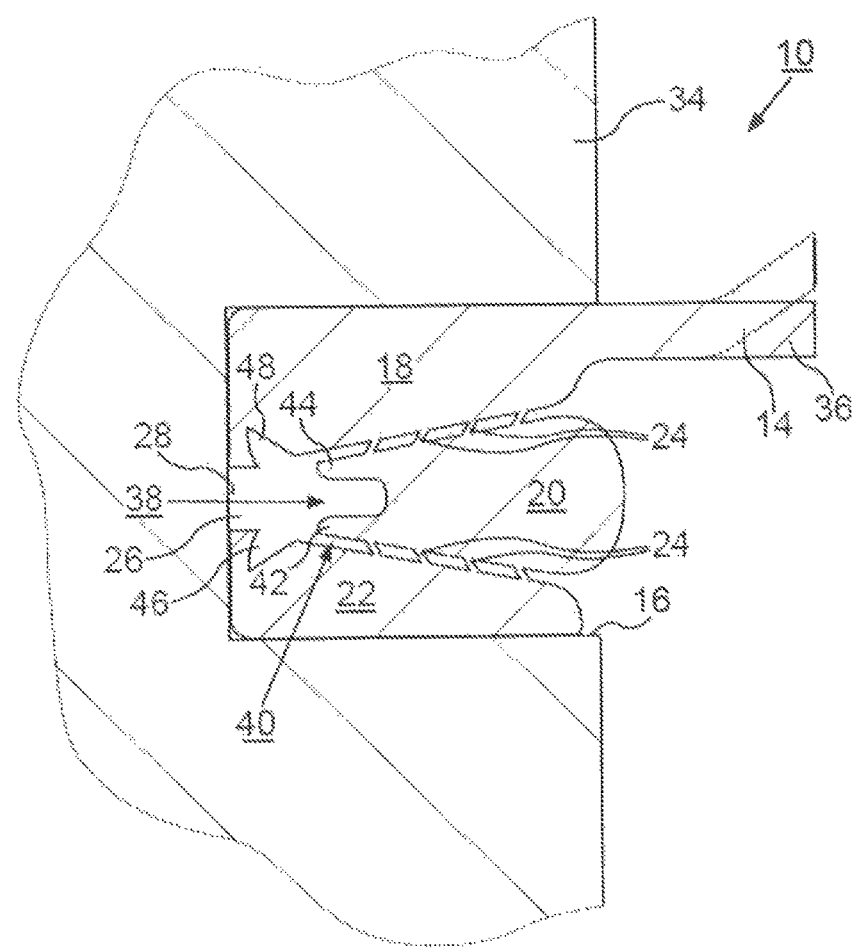
FIG. 2 depicts a schematic cross-sectional view of a second embodiment of the device according to the invention.

FIG. 2 depicts a schematic cross-sectional view of a second embodiment of device 10. Seal element 14 is hereby designed as a labyrinth seal with corresponding labyrinth fins 36. Seal carrier element 18 forms a bottom element of seal element 14 or labyrinth seal. The tips of labyrinth fins 36 can thereby also be designed in an angled manner (see the dashed-line depiction). Even in the second embodiment, fixing body 20 with plastic deformable structure 40 is arranged between seal carrier element 18 and clamping body 22. In turn, fixing body 20 is connected integrally to seal carrier element 18 and clamping body 22 via bar-like connections 24 that can be detached when subjected to a force. In contrast to the first embodiment depicted in FIG. 1, in regard to the second embodiment, not only are fixing body 20, seal carrier element 18, clamping body 22, and bar-like connections 24 produced integrally or in one piece, but seal element 14 is also designed as a labyrinth seal. In regard to the other features, one shall refer to the description of the first embodiment in FIG. 1.

Devices 10 depicted in FIGS. 1 and 2 are produced by means of a generative production process, particularly a selective laser melting or selective laser sintering process. Preferably, a two-step process is thereby performed, wherein in a first step of the two-step process, a uniform powder bed is provided. In a second step and based on layers generated by a three-dimensional CAD model, the powder of the powder bed is selectively welded and thereby solidified. Due to the repeated execution of this two-step process, device 10 to be produced is constructed in layers and thereby successively. The powder provided in the first step thereby consists of metal, a metal alloy, ceramics, or plastic. Other generative production methods can also be used. The use of generative production processes advantageously results in geometric freedom in the design of the device overall and seal carrier element 18 as well as fixing body 20 with structure 40 in particular, particularly in regard to designing brush seal housings or also designing the fins of the labyrinth seal. In addition, it is easily possible to realize variations in the material thickness of the individual elements of device 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for attaching a seal element in a recess of a machine, comprising:
    a seal carrier element;
    a clamping body; and
    a fixing body that is disposed between the seal carrier element and the clamping body,
    wherein the fixing body is connected integrally to the seal carrier element and the clamping body by bar-like connections that are detachable when subjected to a force; and
    wherein when disengaging the bar-like connections between the fixing body, the seal carrier element, and the clamping body, a force-fit results between the fixing body, the seal carrier element, the clamping body, and side walls of the recess of the machine.

2. The device according to claim 1,
    wherein the fixing body comprises a plastic deformable structure formed by a projection.

3. The device according to claim 2, wherein the plastic deformable structure is insertable in a recess in the seal carrier element and/or in the clamping body in a form-fit.

4. The device according to claim 3, wherein the recess in the seal carrier element and/or in the clamping body corresponds at least partially to a shape of the projection.

5. The device according to claim 3, wherein a shape of the plastic deformable structure is designed for a predetermined expansion and direction of the form-fit.

6. The device according to claim 2,
    wherein the plastic deformable structure is formed in one piece with the fixing body.

7. The device according to claim 2,
    wherein a form-fit results between the plastic deformable structure and the seal carrier element and/or the clamping body when the device is disposed in the recess.

8. The device according to claim 1, wherein the bar-like connections form an angle pointing in a direction of the recess.

9. The device according to claim 1, wherein a space defined between the seal carrier element and the clamping body, in which the fixing body is disposed, at least partially tapers toward the recess.

10. The device according to claim 1, wherein the fixing body tapers toward the recess.

11. The device according to claim 1, wherein the fixing body has a wedge shape or a frustoconical shape.

* * * * *